(12) United States Patent
Kim et al.

(10) Patent No.: US 7,161,642 B2
(45) Date of Patent: Jan. 9, 2007

(54) LIQUID CRYSTAL DISPLAY MODULE AND ASSEMBLING METHOD THEREOF

(75) Inventors: Kyoung Sub Kim, Kumi-shi (KR); Seok Hwan Oh, Kimcheon-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 193 days.

(21) Appl. No.: 10/734,183

(22) Filed: Dec. 15, 2003

(65) Prior Publication Data

US 2004/0125269 A1    Jul. 1, 2004

(30) Foreign Application Priority Data

Dec. 26, 2002    (KR)    .................... 10-2002-0084627

(51) Int. Cl.
*G02F 1/1333*    (2006.01)
(52) U.S. Cl. .......................................... 349/58; 349/65
(58) Field of Classification Search ................. 349/58, 349/65, 187

See application file for complete search history.

(56) References Cited

U.S. PATENT DOCUMENTS

| | | | | |
|---|---|---|---|---|
| 5,295,006 A | * | 3/1994 | Lee | 349/3 |
| 6,392,724 B1 | * | 5/2002 | An et al. | 349/58 |
| 6,776,512 B1 | * | 8/2004 | Mori et al. | 362/390 |
| 6,847,416 B1 | * | 1/2005 | Lee et al. | 349/58 |
| 2004/0263716 A1 | * | 12/2004 | Lee et al. | 349/61 |

* cited by examiner

*Primary Examiner*—Toan Ton
(74) *Attorney, Agent, or Firm*—McKenna Long and Aldridge LLP

(57) ABSTRACT

The liquid crystal display module comprises a bottom cover having a plurality of lamps installed thereon and at least one or more of guide projection formed thereon; and a reflection sheet for reflecting light generated from the lamps and having a guide hole in order to be inserted in the guide projection.

15 Claims, 11 Drawing Sheets

LIQUID CRYSTAL DISPLAY MODULE AND ASSEMBLING METHOD THEREOF

This application claims the benefit of the Korean Application No. 2002-84627, filed on Dec. 26, 2002, the entirety of which is hereby incorporated by reference for all purposes as if fully set forth herein.

BACKGROUND OF THE INVENTION

1. Field of the Invention

The present invention relates to a liquid crystal display module, more particularly to a liquid crystal display module and assembling method thereof that is capable of improving operating efficiency.

2. Description of the Related Art

In general, the application of liquid crystal displays (hereinafter, LCDs) has broadened due to their light weight, thinness, and low power consumption. LCDs have found applications in office equipment and audio/video devices to name a few. The LCD works by adjusting the quantity of light transmitted in accordance with an image signal applied to a plurality of control switches, thereby displaying the desired pictures in a screen.

Since liquid crystal is not a light-emitting substance, the LCD needs a separate light source, such as a back light. There are two types of backlights used in LCDs: a direct-below-type and an edge-type. The edge-type includes a fluorescent lamp outside of a surface plate. A transparent light guide directs the light from the fluorescent lamp to be incident to the entire surface of a liquid crystal panel. The direct-below-type backlight arranges the light source on a rear surface of the liquid crystal panel and directly radiates the light to the entire surface of the panel. Compared to the edge-type, the direct-below-type backlight arranges several light sources to improve brightness and has an advantage that the light-emitting surface can be widened.

FIG. 1 is a cross-sectional view illustrating a liquid crystal display module adopting a direct-below-type back light unit of a related art. Referring to FIG. 1, the liquid crystal panel module adopting the conventional direct-below-type back light unit includes a panel guide 6, a liquid crystal panel 20 stacked within the panel guide 6, a bottom cover 2 combined with a support side 18, a back light unit stacked inside of the bottom cover 2, and a top case 8 for fixing the liquid crystal panel 20.

The panel guide 6 is comprised of a mold and a side wall surface of the inside thereof is formed like as step type. The liquid crystal panel 20 is installed in the panel guide 6.

The liquid crystal panel 20 includes a color filter array substrate 20a and a thin film transistor array substrate 20b, which includes thin film transistors for switching the video signals. Liquid crystal cells are arranged in an active matrix form between the color filter array substrate 20a and the thin film transistor array substrate 20b. A tape carrier package (not shown) having a driver integrated circuit for supplying a driving signal to the thin film transistors is installed on the thin film transistor array substrate 20b of the liquid crystal panel 20.

The top case 8 is fabricated as a square band having a surface face and a side-surface face bent at substantially a right angle to the surface face. The top case 8 encloses an edge of the liquid crystal panel 20 and the panel guide 6.

The bottom cover 2, as shown in FIG. 2, is formed to have a bottom surface 2b and an inclination surface 2a extended in one direction from the bottom surface 2b. Therefore, the bottom cover 2 is open except for the inclination surface 2a and the bottom surface 2b. As shown in FIG. 1, a support side 18 is positioned to enclose the edge of the bottom cover 2 in the open side region of the bottom cover 2. That is, the support side 18 is formed to face in another direction from the bottom surface 2b. The support side 18 is attached to the bottom cover 2 by a screw (not shown). The support side 18 is molded and functions to reflect the light coming from the side of the lamp 12 to the diffusion plate 16.

A rugged part 22 extended in the longitudinal direction of the lamp 12 is formed in the bottom surface 2b of the bottom cover 2. The rugged part 22 functions to guide a lamp holder 10 having the lamp 12 shown in FIG. 3. Further, a first double-sided adhesive tape 24 is positioned on the bottom cover 2, so as to adhere to a reflection sheet 14.

The back light unit includes a plurality of lamps 12 for generating the light, a reflection sheet 14 located under the lamps 12, a diffusion plate 16 located over the plurality of lamps 12, and optical sheets (not shown) located on the diffusion plate 16. Each of lamps 12 comprises a glass tube, inert gases existing in a glass tube, a cathode and an anode installed respectively at opposite ends of the glass tube, and a phosphorus applied to the inside wall of the glass tube. The lamps 12, as shown in FIG. 3, are divided into n groups (where n is a positive integer) and are inserted into the lamp holder 10.

The reflection sheet 14 serves to reflect the light emitted from the lamp 12 towards the bottom cover 2 back to the diffusion plate 16 to thereby improve the efficiency of the light generated by the lamp 12. The reflection sheet 14, as shown in FIG. 4, includes a first reflection region 14a corresponding to the inclination surface 2a of the bottom cover 2, and a second reflection region 14b corresponding to the bottom surface 2b of the bottom cover 2. A half-cutting line HCL dividing the sheet in two is formed between the first reflection region 14a and the second reflection region 14b. The first reflection region 14a is bent to adhere to the inclination surface 2a of the bottom cover with respect to half-cutting line HCL by the second double-sided adhesive tape 26. The second double-sided adhesive tape 26 is attached to a rear surface of the reflection sheet 14.

The diffusion plate 16 serves to redirect the light radiated from the lamps 12 to be incident to the liquid crystal panel 20 in a wide angle. The diffusion plate 16 is coated with light-diffusion material and a film comprised of transparent resin.

The optical sheets (not shown) reduce a viewing angle of the light emitted from the diffusion plate 16 to improve the brightness of the liquid crystal display while reducing its power consumption.

The conventional reflection sheet 14 of the liquid crystal display module and the bottom cover 2 are adhered to each other by the first and the second double-sided adhesive tapes 24 and 26. Before being adhered, the reflection sheet 14 and the bottom cover 2 are guided by using guide line 30 of a jig 28 shown in FIG. 5. That is, after installing the bottom cover 2 as based on guide line 30 on the jig 28, the reflection sheet 14 is installed on the bottom cover 2 along the guide line 30 on the bottom cover 2. Then, the reflection sheet 14 is attached on the bottom cover 2 by using the first and the second double-sided adhesive tapes 24 and 26.

Since a special jig 28 is needed to guide the reflection sheet 14 and the bottom cover 2 of the conventional liquid crystal display module, there is a problem that an operating efficiency is lowered.

SUMMARY OF THE INVENTION

Accordingly, the present invention is directed to a liquid crystal display device that substantially obviates one or more problems due to limitations and disadvantages of the related art.

It is an advantage of the present invention to provide a liquid crystal display module and an assembling method thereof that is capable of improving an operation efficiency.

In order to achieve these and other advantages of the invention, the liquid crystal display module according to an aspect of the present invention includes a bottom cover having a plurality of lamps installed thereon and at least one or more of guide projection formed thereon; and a reflection sheet for reflecting light generated from the lamps reflected and having a guide hole formed in order to be inserted to the guide projection.

The liquid crystal display module further comprises: a diffusion plate for diffusing the light generated from the lamps.

The liquid crystal display module further comprises: a lamp holder for accommodating the lamps in a plurality of groups and located on the reflection sheet; a display panel for implementing pictures by using light coming from the diffusion plate; a guide panel having the display panel installed thereon; and a top case for enclosing the guide panel and the display panel.

The liquid crystal display module further comprises: a rugged part for guiding the lamp holder, wherein the rugged part is formed ruggedly by designated intervals in one side of the bottom cover and for guiding the lamp holder.

The bottom cover comprises a bottom surface having the guide projection formed in one side of the bottom surface; and an inclination surface extended from the bottom surface and inclined by a designated angle with respect to the bottom surface to face each other, and wherein the bottom cover is open except for the bottom surface and the side surface thereof.

The height of the guide projection is formed to be greater than the thickness of the reflection sheet.

The bottom cover is coupled to a support side by a screw.

The bottom cover and the reflection sheet are adhered to each other by a double-sided adhesive tape.

The reflection sheet comprises a first reflection region corresponding to the bottom surface of the bottom cover; and a second reflection region corresponding to the inclination surface of the bottom cover and inclined with respect to the first region and a half-cutting line.

A method of assembling a reflection sheet on a bottom cover comprises: inserting a guide hole of the reflection sheet to a guide projection of a bottom cover; and adhering the reflection sheet and the bottom cover by using an adhesive agent.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to embodiments of the present invention, examples of which are illustrated in the accompanying drawings.

Hereinafter, the embodiment of the present invention will be explained in detail with reference to FIGS. 6 to 10B.

Figure 1:
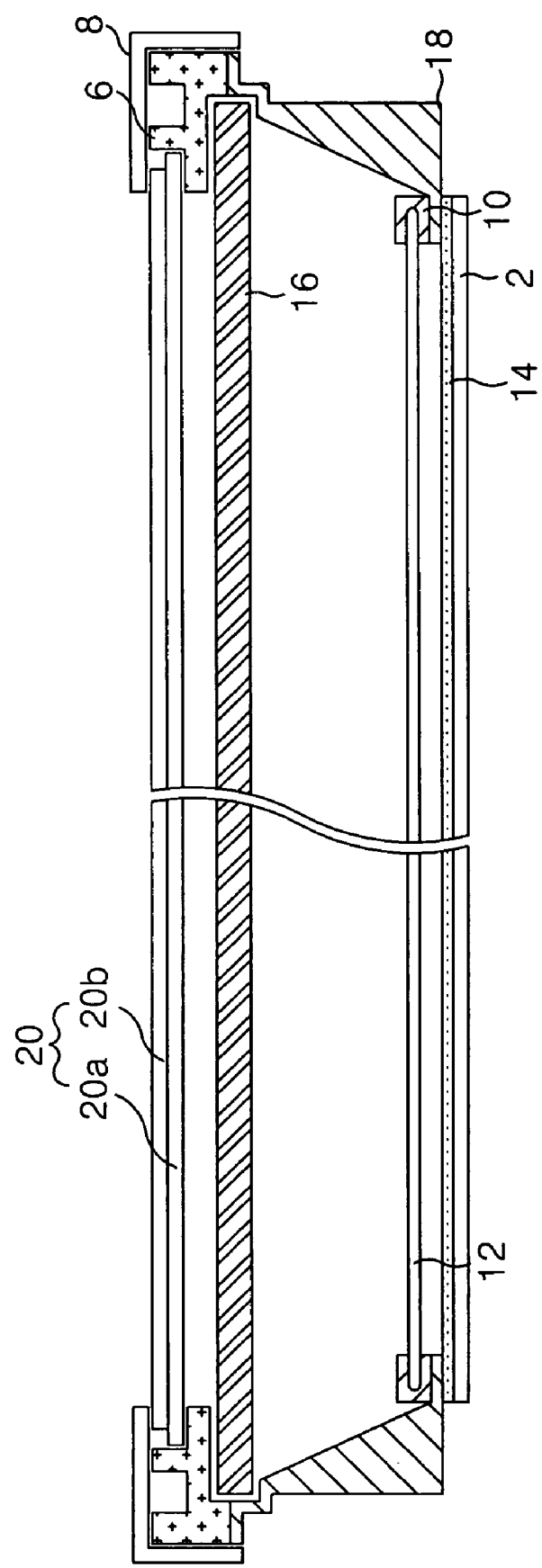
FIG. 1 is a cross-sectional view illustrating a liquid crystal display module adopting a direct-below-type back light unit of a related art.
Figure 2:
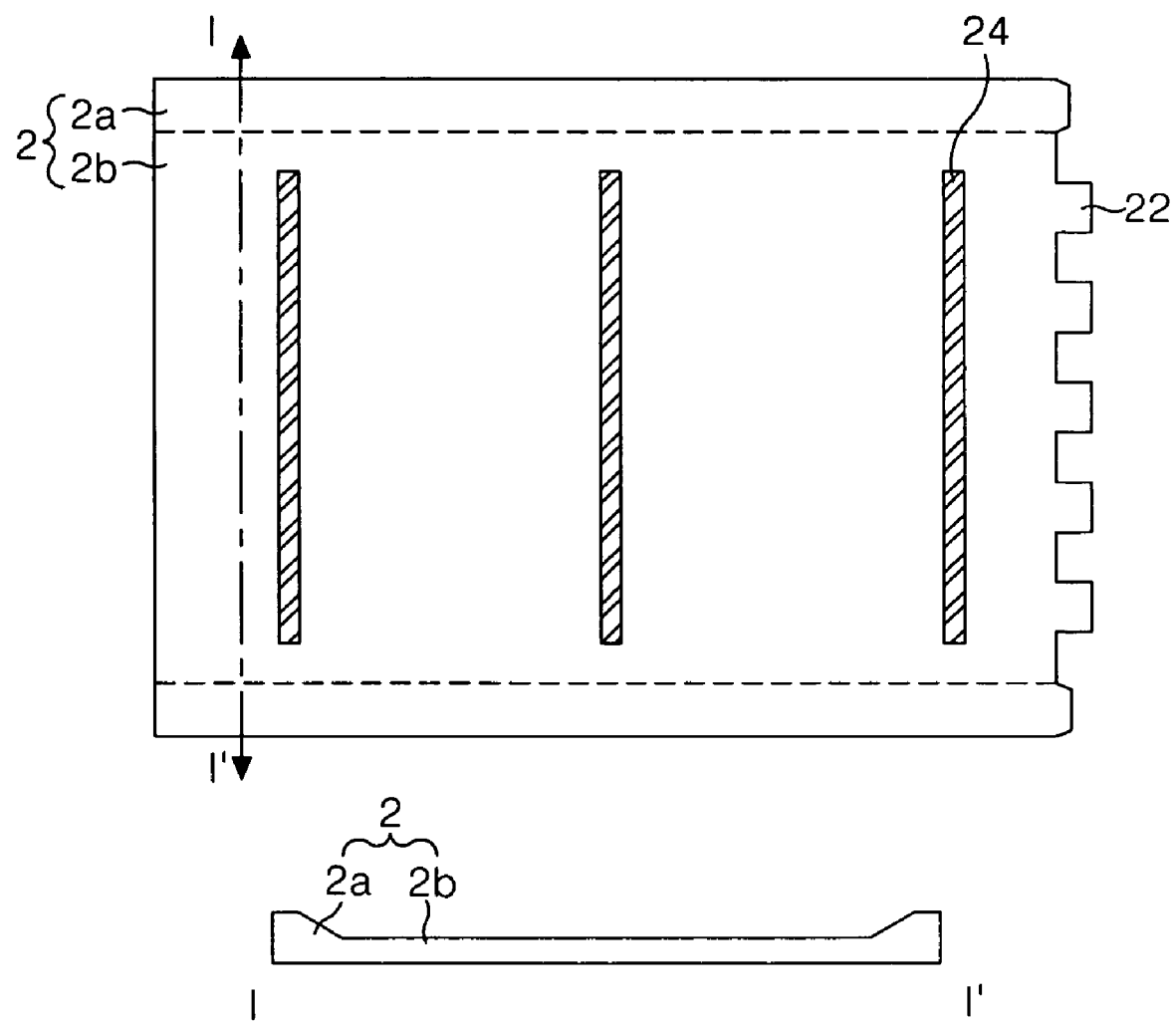
FIG. 2 illustrates in detail a bottom cover shown in FIG. 1.
Figure 3:
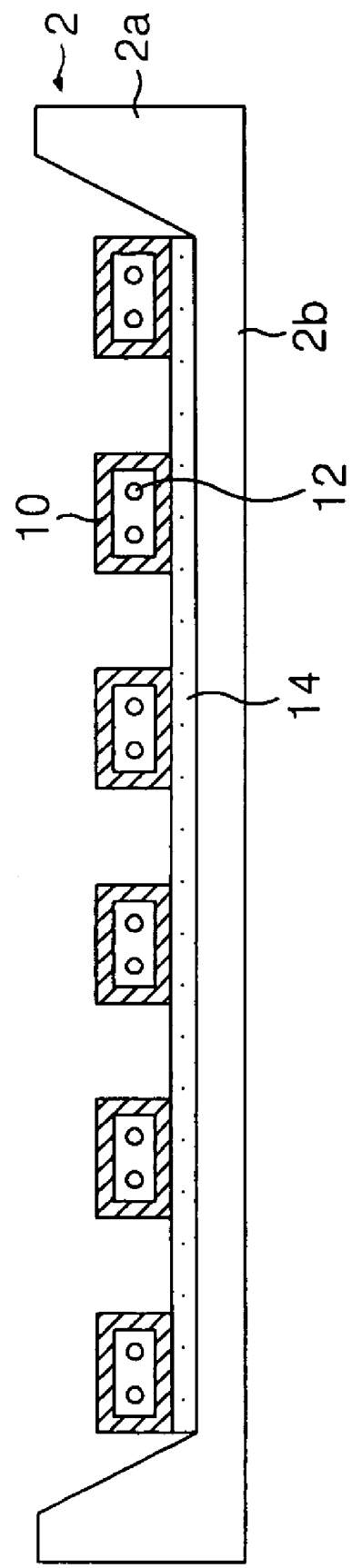
FIG. 3 illustrates in detail a lamp shown in FIG. 1.
Figure 4:
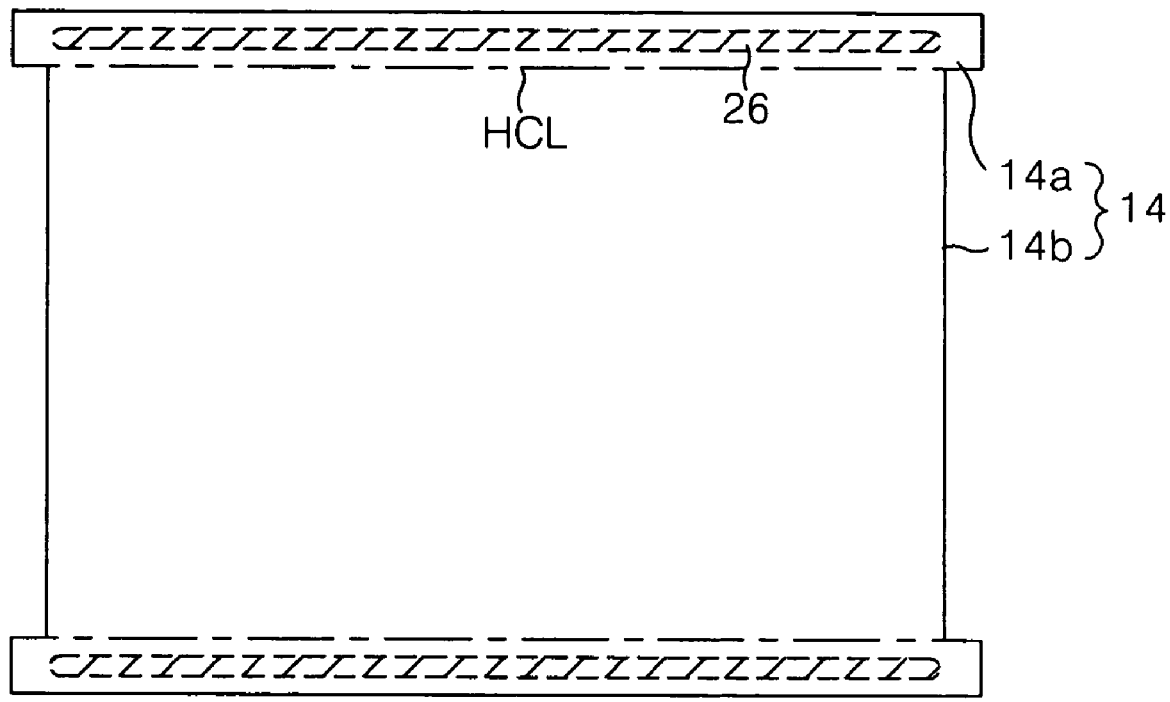
FIG. 4 illustrates in detail a reflection sheet shown in FIG. 1.
Figure 5:
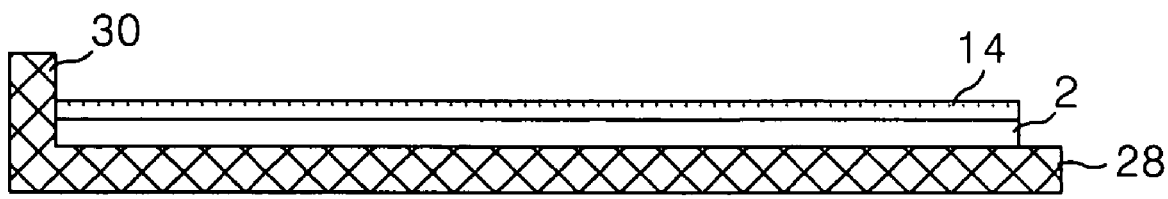
FIG. 5 illustrates a jig to guide a reflection sheet and a bottom cover shown in FIG. 1.
Figure 6:
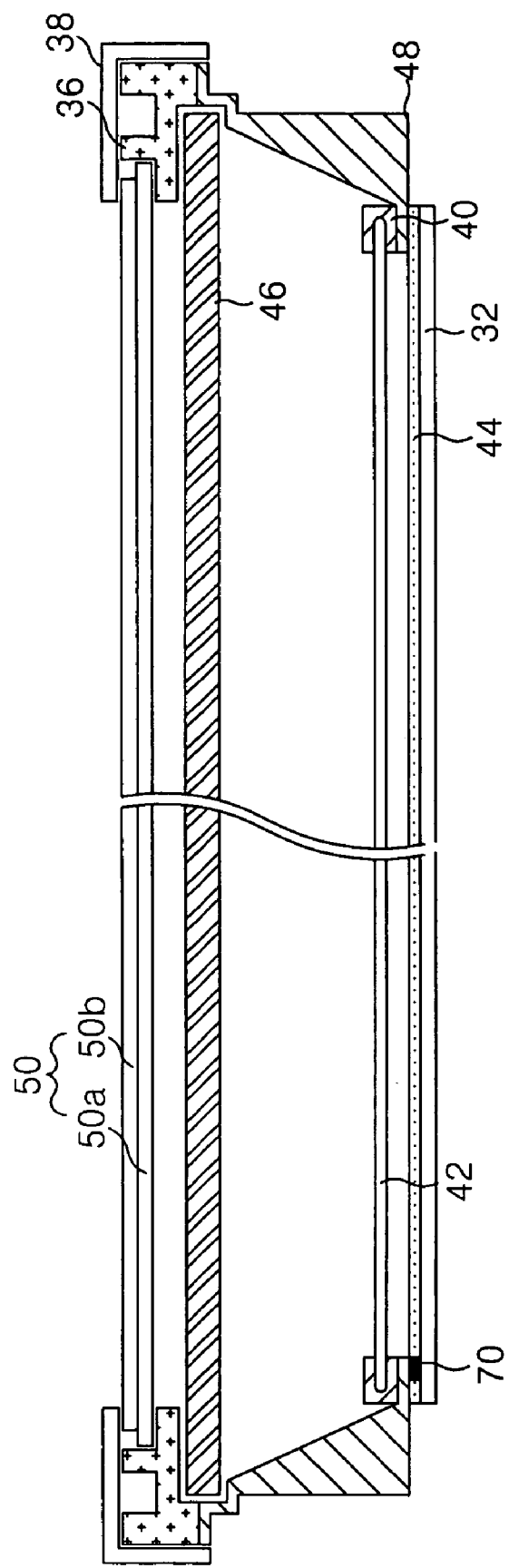
FIG. 6 is a cross-sectional view illustrating a liquid crystal display module adopting a direct-below-type back light unit according to the present invention.

FIG. 6 is a cross-sectional view illustrating a liquid crystal display module adopting a direct-below-type back light unit according to the present invention. Referring to FIG. 6, the liquid crystal panel module having the direct-below-type back light unit according to the present invention includes a panel guide 36, a liquid crystal panel 50 stacked within the panel guide 36, a bottom cover 32 combined with a support side 48, a back light unit stacked inside of the bottom cover 32, and a top case 38 for fixing the liquid crystal panel 50.

The panel guide 36 is molded. A side wall surface of the inside of the panel guide 36 is formed in a step-like structure. The liquid crystal panel 50 is installed in the panel guide 36.

The liquid crystal panel 50 includes a color filter array substrate 50a and a thin film transistor array substrate 50b. Liquid crystal cells are arranged in an active matrix form between the color filter array substrate 50a and the thin film transistor array substrate 50b that has thin film transistors for switching video signals. A tape carrier package (not shown) having a driver integrated circuit for supplying a driving signal to the thin film transistors is installed on the thin film transistor array substrate 50b of the liquid crystal panel 50.

The top case 38 is fabricated in a square band and has a plane part and a side-surface part bent perpendicular to the plane part. The top case 38 encloses an edge of the liquid crystal panel 50 and the panel guide 36.

Figure 7:
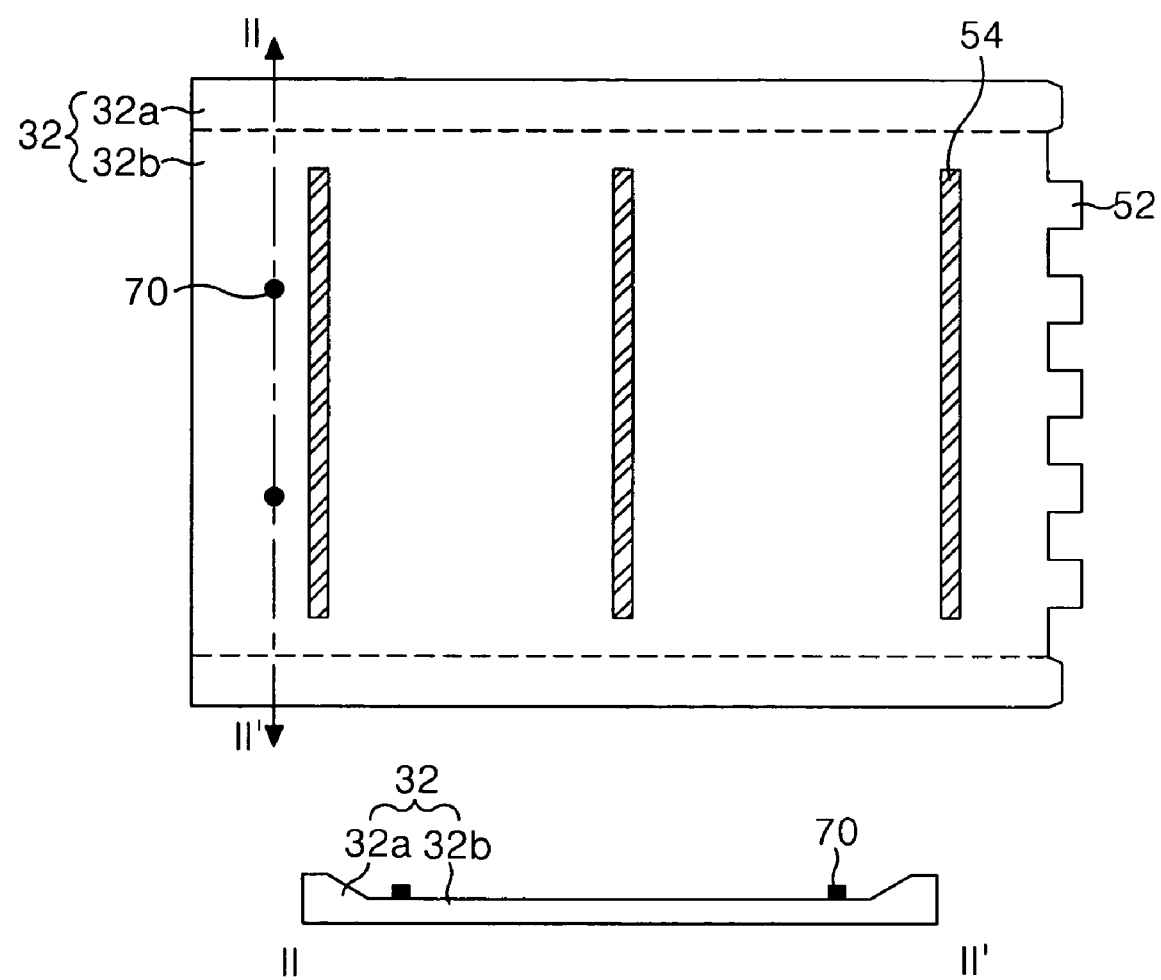
FIG. 7 illustrates in detail a bottom cover shown in FIG. 5.

The bottom cover 32, as shown in FIG. 7, is formed to have a bottom surface 32b and inclination surfaces 32a extended in one direction away from the bottom surface 32b and opposite each other. That is, the bottom cover 32 is open except for the inclination surface 32a and the bottom surface 32b. As shown in FIG. 6, a support side 48 is located to enclose the edge of the bottom cover 32 in the opened side region of the bottom cover 32. That is, the support side 48 is formed to face in another direction from the bottom surface 32b and is combined with the bottom cover 32 by a screw (not shown) or any other fastening means. The support side 48 is molded and functions to reflect the light coming from the side of the lamp to the diffusion plate 46.

The bottom surface 32b of the bottom cover 32 has a rugged or uneven part 52 extended to the longitudinal direction of the lamp, and at least two guide projections 70 projected from the bottom surface 32b.

Figure 8:
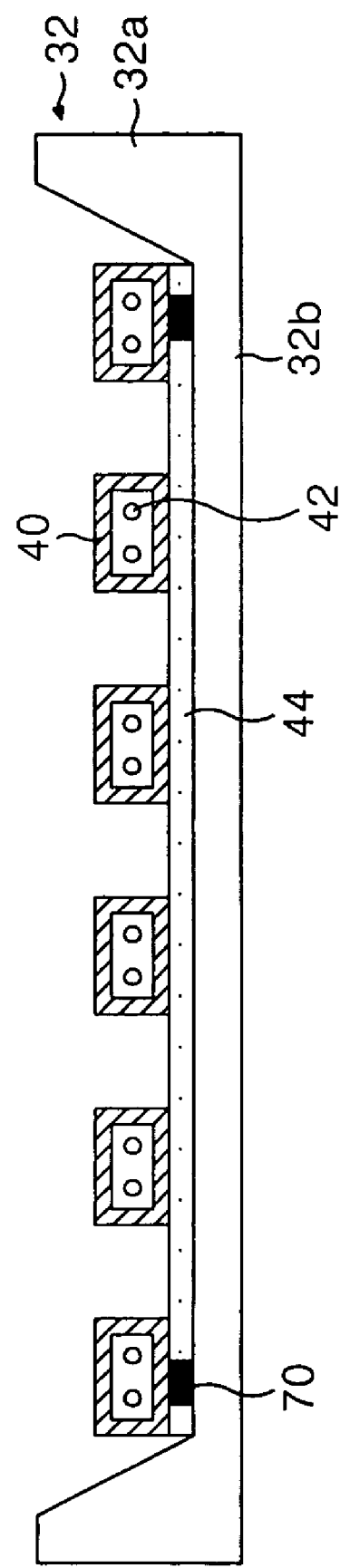
FIG. 8 illustrates in detail a lamp shown in FIG. 6.

The rugged part 52 functions to guide a lamp holder 40 having the lamp 42 as shown in FIG. 8. That is, the lamp holder 40 is inserted in non-rugged part between the rugged parts 52.

The guide projection 70 is positioned on the opposite side of the bottom surface 32b from the rugged part 52. The guide projection 70 is formed to have a height greater than the thickness of the reflection sheet 44 in the bottom surface of the bottom cover 32. The guide projection 70 may have a polygonal shape or a circular shape. The guide projection 70 may also overlap a guide hole of the reflection sheet 44 that is used to guide the reflection sheet 44.

On the other hand, a first double-sided adhesive tape 54 may be placed on the bottom surface 32b of the bottom cover 32 to attach the reflection sheet 44.

The back light unit includes a plurality of lamps 42 for generating light, a reflection sheet 44 located under the lamps 42, a diffusion plate 46 located over the lamps 42, and optical sheets (not shown) located on the diffusion plate 46.

Each of the lamps 42 is made of a glass tube containing inert gases and a cathode and an anode installed respectively at opposite ends of the glass tube. A phosphorous is applied to the inside wall of the glass tube. The lamps 42, as shown in FIG. 8, are divided into n groups (where n is a positive integer) and are inserted in the lamp holder 40.

Figure 9:
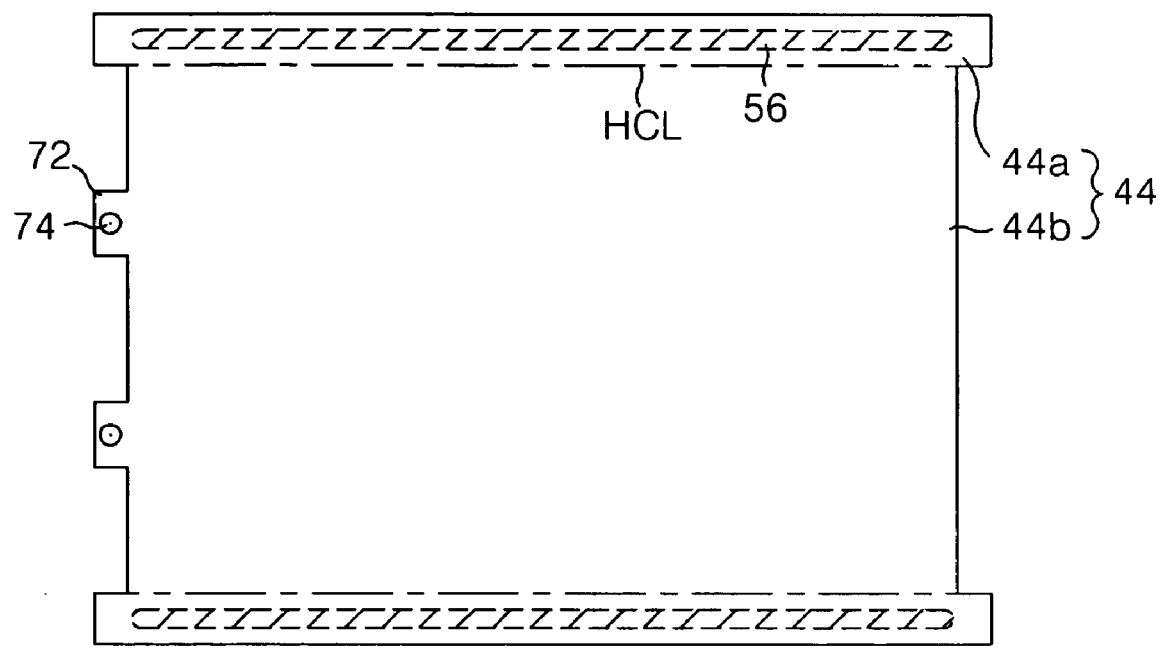
FIG. 9 illustrates in detail a reflection sheet shown in FIG. 6.

The reflection sheet 44 serves to reflect the light coming from the lamp 42 to the bottom cover 32 back to the diffusion plate 46, thereby improving the efficiency of the light generated in the lamp 42. The reflection sheet 44, as shown in FIG. 9, includes a first reflection region 44a corresponding to the inclination surface 32a of the bottom cover 32, and a second reflection region 44b corresponding to the bottom surface 32b of the bottom cover 32. A half-cutting line HCL is formed between the first reflection region 44a and the second reflection region 44b. The first reflection region 44a is bent with respect to the half-cutting line HCL to adhere to the inclination surface 32a of the bottom cover by the second double-sided adhesive tape 56. In this connection, the second double-sided adhesive tape 56 is attached to the rear surface of the reflection sheet 44. The half-cutting line HCL forms a slit in the reflection sheet 44 so that the first reflection region 44a of the reflection sheet 44 is easily bent.

The guide hole 74 is formed to penetrate the reflection sheet 44 in at least one side of the first reflection region 44a. The guide hole 74 is respectively formed in at least two parts 72 extended from one side of the reflection sheet 44. The guide hole 74 is formed to overlap with the guide projection 70 of the bottom cover 32.

The diffusion plate 46 serves to proceed the light radiated from the lamps 42 to the liquid crystal panel 50 and makes light incident in an wide angle. The diffusion plate 46 includes a transparent resin film having both sides coated with light-diffusion materials.

The optical sheets (not shown) reduce a viewing angle of the light coming from the diffusion plate 46 to improve the brightness at a front of the liquid crystal display while reducing power consumption.

Figure 10A:
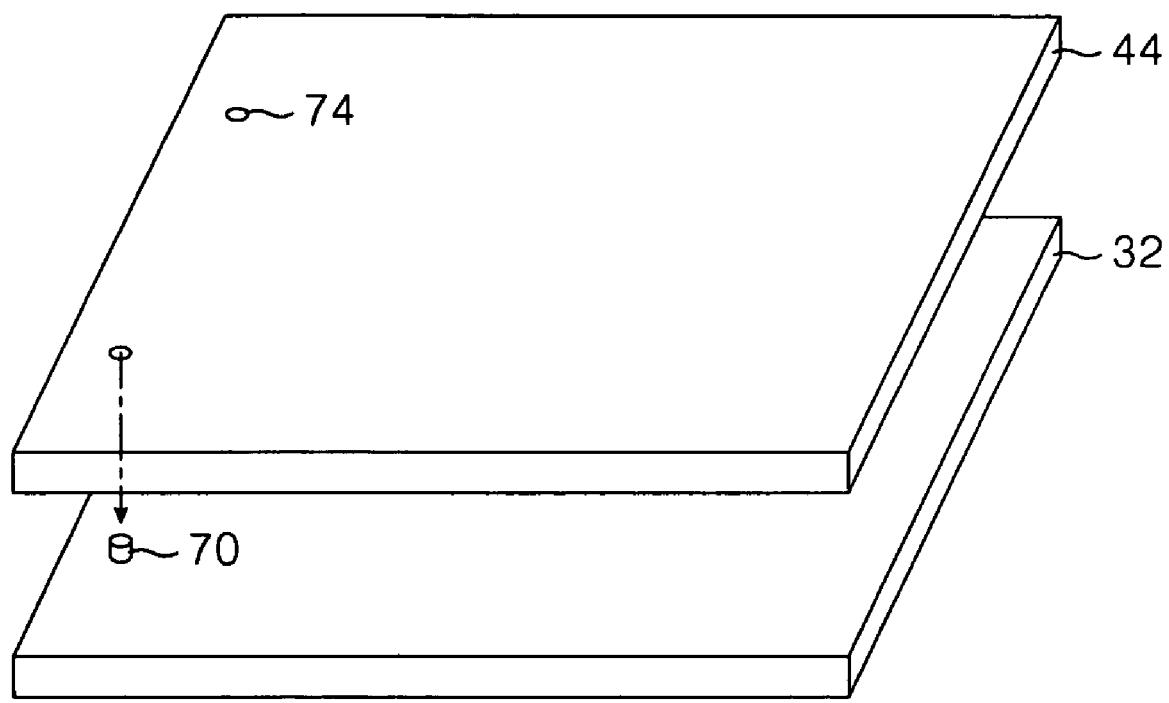
FIGS. 10A and 10B illustrate a method assembling a reflection sheet and a bottom cover shown in FIG. 6.
Figure 10B:
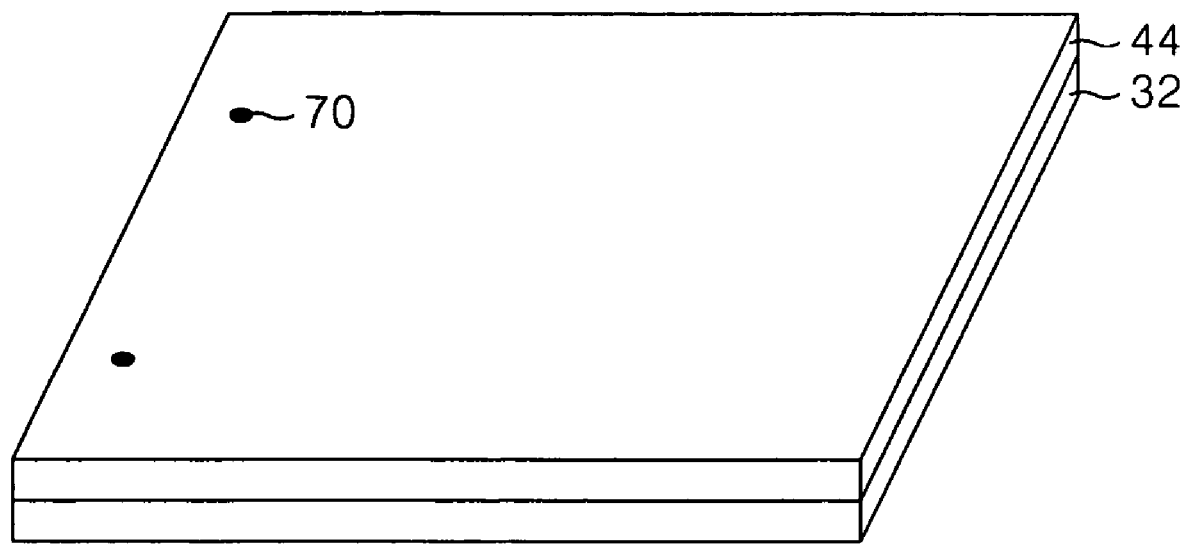

FIGS. 10A and 10B illustrate a process for combining the bottom cover and the reflection sheet according to the present invention.

First, as shown in FIG. 10A, the process includes preparing the bottom cover 32 having the guide projection 70 and the reflection sheet 22 having the guide hole 74. The guide projection 70 is formed one or more at edge of the bottom surface of the bottom cover 32, and the guide hole 74 is formed to penetrate the region of the reflection sheet 44 of region overlapped with the guide projection 70.

The bottom cover 32 and the reflection sheet 44 can be guided by the guide projection 70 and the guide hole 74. That is, the guide hole 74 of the reflection sheet 44 is inserted in the guide projection 70 of the bottom cover 32 to fix the bottom cover 32 and the reflection sheet, and then the bottom cover 32 and the reflection sheet 44 are attached by using the first and the second double-sided adhesive tape as shown in FIG. 10B.

As described above, in the liquid crystal display module and the assembling method thereof according to the present invention, the guide hole and the guide projection are formed respectively in one side of the reflection sheet and the bottom cover. The guide projection is inserted in the guide hole and thereby the reflection sheet and the bottom cover can be guided without a special jig. Since the special jig is unnecessary, the operating efficiency is improved. Further, in the liquid crystal module and the assembling method thereof according to the present invention, the reflection sheet is attached on the bottom cover by the double-sided adhesive tape in place of a high cost reflection plate made of ASLET substance, thereby further reducing cost.

Although the present invention has been explained by the embodiments shown in the drawings described above, it will be apparent to those skilled in the art that the invention is not limited to the embodiments, but rather that various modifications and variations thereof can be made in the present invention without departing from the spirit or scope of the invention. Accordingly, the scope of the invention shall be determined only by the appended claims and their equivalents.

What is claimed is:

1. A liquid crystal display module, comprising:
   a bottom cover having a plurality of lamp holders installed thereon and at least one or more guide projections thereon; and
   a reflection sheet that reflects light and has a guide hole to receive each of the guide projections, wherein
   the bottom cover has rugged parts for guiding the lamp holders to be inserted between the rugged parts.

2. The liquid crystal display module according to claim 1, further comprising a diffusion plate that diffuses light.

3. The liquid crystal display module according to claim 2, further comprising:
   a lamp holder that accommodates the lamps by groups and that is located on the reflection sheet;
   a display panel that implements pictures by using light diffused by the diffusion plate;
   a guide panel having the display panel installed thereon; and
   a top case that encloses the guide panel and the display panel.

4. The liquid crystal display module according to claim 3, further comprising an uneven part that guides the lamp holder, wherein the uneven part has protrusions at designated intervals at one side of the bottom cover.

5. The liquid crystal display module according to claim 1, wherein the bottom cover comprises:
   a bottom surface having the guide projection formed in one side thereof; and
   an inclination surface extended from the bottom surface and inclined by a designated angle with respect to the bottom surface,
   wherein the bottom cover is open except for the bottom surface and the side surface thereof.

6. The liquid crystal display module according to claim 5, wherein the reflection sheet comprises:
   a first reflection region corresponding to the bottom surface of the bottom cover; and
   a second reflection region corresponding to the inclination surface of the bottom cover and inclined with respect to the first region and a half-cutting line.

7. The liquid crystal display module according to claim 1, wherein the height of the guide projection is greater than the thickness of the reflection sheet.

8. The liquid crystal display module according to claim 1, wherein the bottom cover is coupled with a support side by a coupling means.

9. The liquid crystal display module according to claim 1, wherein the bottom cover and the reflection sheet are adhered to each other by a double-sided adhesive tape.

10. A method of assembling a reflection sheet on a bottom cover, comprising:
   inserting a guide projection of a bottom cover into a guide hole of a reflection sheet; and
   attaching the reflection sheet to the bottom cover, wherein the bottom cover has rugged parts for guiding lamp holders to be inserted between the rugged parts.

11. The method according to claim 10, wherein the height of the guide projections is greater than the thickness of the reflection sheet.

12. The method according to claim 10, wherein the reflection sheet is attached to the bottom cover using an adhesive.

13. The method according to claim 10, wherein the reflection sheet is attached to the bottom cover using adhesive tape.

14. A liquid crystal display, comprising:
   two substrates having liquid crystal disposed therebetween;
   a backlight that emits light through the substrates and the liquid crystal layer;
   a bottom cover having a plurality of lamp holders installed thereon and a guide projection thereon, the guide projection protruding into the interior of the liquid crystal display; and
   a reflection sheet that reflects light generated from the backlight and having a guide hole to receive the guide projection, wherein
   the bottom cover has rugged parts for guiding the lamp holders to be inserted between the rugged parts.

15. The liquid crystal display according to claim 14, wherein only an adhesive is between the reflection sheet and the bottom cover.

\* \* \* \* \*